United States Patent [19]

Watanabe et al.

[11] Patent Number: 5,214,786

[45] Date of Patent: May 25, 1993

[54] RISC SYSTEM PERFORMING CALLS AND RETURNS WITHOUT SAVING OR RESTORING WINDOW POINTERS AND DELAYING SAVING UNTIL MULTI-REGISTER AREAS ARE FILLED

[75] Inventors: Tan Watanabe, Yokohama; Keiichi Kurakazu, Tachikawa; Yugo Kashiwagi, Koganei; Keisuke Toyama, Machida; Thoru Nojiri, Tokyo, all of Japan

[73] Assignee: Hitachi, Ltd., Tokyo, Japan

[21] Appl. No.: 37,843

[22] Filed: Apr. 13, 1987

[30] Foreign Application Priority Data

Apr. 14, 1986 [JP] Japan ................. 61-85422

[51] Int. Cl.⁵ .................................. G06F 9/40
[52] U.S. Cl. ......................... 395/800; 364/247; 364/232.13; 364/247; 364/262.4; 364/DIG. 1; 395/375
[58] Field of Search ... 364/200 MS File, 900 MS File; 393/800, 375

[56] References Cited

U.S. PATENT DOCUMENTS

| | | | |
|---|---|---|---|
| 3,657,736 | 4/1972 | Boom | 364/200 |
| 3,781,810 | 12/1973 | Downing | 364/200 |
| 3,794,980 | 2/1974 | Cogar | 364/200 |
| 3,972,029 | 7/1976 | Bailey | 364/200 |
| 4,079,448 | 3/1978 | N'Guyen et al. | 364/200 |
| 4,173,782 | 11/1979 | Dixon | 364/200 |
| 4,241,397 | 12/1980 | Strecker | 364/200 |
| 4,297,743 | 10/1981 | Appell | 364/200 |
| 4,320,456 | 3/1982 | Heise | 364/200 |
| 4,399,507 | 8/1983 | Cosgrove | 364/200 |
| 4,410,939 | 10/1983 | Kawakami | 364/200 |
| 4,428,045 | 1/1984 | Davidian | |
| 4,435,765 | 3/1984 | Uchida et al. | 364/200 |
| 4,445,173 | 4/1984 | Pilat | 364/200 |
| 4,450,522 | 5/1984 | Pilat | 364/200 |
| 4,499,535 | 2/1985 | Bachman | 364/200 |
| 4,600,986 | 7/1986 | Scheuneman et al. | 364/200 |
| 4,611,278 | 9/1986 | Boothroyd et al. | 364/200 |
| 4,613,935 | 9/1986 | Couleur | 364/200 |
| 4,615,006 | 9/1986 | Hirano | 364/200 |
| 4,633,434 | 12/1986 | Scheuneman | 364/900 |
| 4,652,993 | 3/1987 | Scheuneman et al. | 364/200 |
| 4,674,032 | 6/1987 | Michaelson | 364/200 |
| 4,704,679 | 11/1987 | Hassler | 364/200 |
| 4,730,248 | 3/1988 | Watanabe | 364/200 |
| 4,733,346 | 3/1988 | Tanaka | 364/200 |
| 4,740,893 | 4/1988 | Bucholz | 364/200 |
| 4,761,733 | 8/1988 | McCrocklin et al. | 364/200 |
| 4,766,566 | 8/1988 | Chuang | 364/900 |
| 4,779,187 | 10/1988 | Letwin | 364/200 |
| 4,811,208 | 3/1989 | Myers | 364/200 |
| 4,829,422 | 5/1989 | Morton | 364/200 |
| 4,833,640 | 5/1989 | Baba | 364/900 |

FOREIGN PATENT DOCUMENTS 59-105152 6/1984 Japan.
60-54049 3/1985 Japan.

OTHER PUBLICATIONS

*Reduced Instruction Set Computer Architectures for VLSI* by Manolis G. H. Katevenis, MIT Press 1983 pp. 52–65, 136–145, 176–188, 194–198.
*A VLSI RISC* by David A. Patterson and Carlo H. Sequin 1982 IEEE pp. 8–18, 20.
Strategies for Managing the Register File in RISC. Yuval Tamir and Carlo Sequin 1983 IEEE pp. 977–986.
Micro & Mini Computers Systems Design Seminar Dec. 1971, pp. 1–24, Organisation of a Mini Computer.
Ring bank mode speeds 16-bit microoperation, New Electronics vol. 19, No. 20, Oct. 1986, p. 43.
A 16-bit microprocessor with multi bank architecture 1986 Proceedings Fall Joint Computer Conference, pp. 1015–1019.
Electronic Design vol. 33, No. 1, Jan. 1985, RISC Machines, pp. 180, 188.

*Primary Examiner*—Lawrence E. Anderson
*Assistant Examiner*—Eric Coleman
*Attorney, Agent, or Firm*—Antonelli, Terry, Stout & Kraus

[57] ABSTRACT

In a computer system equipped with a large number of registers which have an access time much shorter than that of a main memory, a register designating address part in which the assignment of an area register having a register address of a register area as its value and the assignment of a register displacement value expressing a relative register address within the register area are combined is provided in each instruction so that, even when physical registers are increased, save and restore of registers attendant upon task switches, etc. may be lessened to attain a raised speed of program run processing.

Besides, an address part for designating the main memory is provided in the same instruction.

34 Claims, 9 Drawing Sheets

RISC SYSTEM PERFORMING CALLS AND RETURNS WITHOUT SAVING OR RESTORING WINDOW POINTERS AND DELAYING SAVING UNTIL MULTI-REGISTER AREAS ARE FILLED

BACKGROUND OF THE INVENTION

The present invention relates to an information processing apparatus, and more particularly to an information processing apparatus adopting an organization method and an access method for registers which are well suited to a case where the access times of the registers are much shorter than the access time of a main memory.

Heretofore, in a computer system furnished with a large number of registers, a method of assigning the individual registers has been discussed in, for example, D.A. Patterson and C.H. Sequin: A VLSI RISC, Computer Sep. 1982, IEEE (pp. 8–21) and has generally been realized in the form of a RISC I-microprocessor (hereinbelow, abbreviated to "RISC I").

In the RISC I, there are banks of 32 logical registers which can be assigned by instructions, and a total of 138 physical registers exist. Letting $L_0, L_1, \ldots$ and $L_{31}$ denote the logical registers to be assigned by the instructions, and letting $R_0, R_1, \ldots$ and $R_{137}$ denote the physical registers, the registers $L_0, L_1, \ldots$ and $L_9$ correspond respectively to registers $R_0, R_1, \ldots$ and $R_9$ at all times. The registers $L_{10}, L_{11}, \ldots$ and $L_{31}$ are respectively held in correspondence with registers $R_{116}, R_{117}, \ldots$ and $R_{137}$ at the time of initialization. However, they are respectively brought into correspondence with the registers $R_{100}, R_{101}, \ldots$ and $R_{121}$ after the call of the first subprogram, and with the registers $R_{84}, R_{85}, \ldots$ and $R_{105}$ after the call of a subprogram directly below the level of the first subprogram. In this manner, the correspondence of the registers is shifted or advanced by 16 registers in conformity with the nest level of the subprogram call. At the time of return from a subprogram, the correspondence is brought back upwards or retracted by 16 registers. The logical registers $L_{26}, L_{27}, \ldots$ and $L_{31}$ before the subprogram call indicate the same physical registers as those corresponding to the registers $L_{10}, L_{11}, \ldots$ and $L_{15}$ after the subprogram call, respectively.

In this fashion, partly different register sets are utilized in accordance with the nest levels of the subprogram calls, thereby intending to lessen the "save" and "restore" operations of the registers. When the number of the nest levels of the subprogram calls becomes large and the physical registers are used up, interruption arises.

With the prior art as stated above, the following problems are involved: (a) A register area to be used is shifted upwards or downwards (advanced or retracted) by a fixed amount only when a subprogram is returned or called, and it is not considered at all to change a register position for use in adaptation to the property, of a program or to a programming form, so that the efficient utilization of registers cannot be attained. (b) Large quantities of physical registers need to be saved and restored when a task is switched, and further increase in the number of physical registers does not lead to increase in speed. (c) When physical registers have been used up, register saving, etc. operations are executed by an interrupt handling routine, and hence, a long time is expended for processing.

Among them, the item (b) poses a problem in that the high-density integration technology of LSI's cannot be fully exploited.

SUMMARY OF THE INVENTION

An object of the present invention is to avoid the aforementioned problems, and to provide an information processing apparatus in which the save and restore operations of registers attendant upon subprogram reference and task switching can be lessened with increase in the number of physical registers, whereby register allocation at the creation of a program is simplified, and an increased speed of processing can be attained.

The information processing apparatus of the present invention for accomplishing the above-mentioned object is characterized in that means to simultaneously assign in one instruction the respective address space areas of a main memory and a register block is provided, and that the assignment of a register to be used by each instruction is expressed by the combination of the assignment of an area register having the address of a register area as a value and the assignment of a register displacement denoting a relative register address within the register area.

Now, the fundamental concepts of the present invention will be described.

The value of an area register is set by software in conformity with the use of registers at each point of time as processing by a computer proceeds. In general, a plurality of area registers are provided though a single area register may well be provided. The register field of each individual instruction is configured of an area register part which indicates the area register to be used, and a register displacement part which indicates a relative register address within the indicated area. The area register is realized by a special-purpose register in some cases, and by a register of specific area (hereinbelow, called "specific register") within a register block in which general registers are assembled, in the other cases. On the occasion of employing the special-purpose register, instructions for loading and storing the value of the register are provided. In contrast, on the occasion of employing the specific register, the assignment of the area register corresponding to the specific area is omitted, and the address of the area register to be used is assigned by only the register displacement.

As a mechanism which synthesizes a register address out of the value of the assigned area register and the register displacement value, an adder for arithmetically adding both the values is used in some cases, and an OR circuit of high speed is used in the other cases.

The registers are organized in the shape of a ring by determining the succeeding register and the preceding register for each individual register, whereby the advance and retracting of a register position for use can be uniformly handled.

Besides, in order to avoid interference of programs attributed to the fixation of registers for use in each program and to attain the efficient utilization of the registers as well as the simplification of register allocation, register banks each consisting of a certain number of registers are provided in such a manner that any of the register banks to be used can be determined by the value to the area register.

Moreover, in order to curtail the saving and restoring processes of registers attendant upon subprogram calls and task switches, the register block is divided into a plurality of register areas (register banks), which are further divided into a ring bank composed of a plurality of banks that advances and retracts a bank position for use in the shape of a ring with the call and return of a subprogram and a plurality of global banks that can have their assignment changed with the task switch, and bank control instructions for controlling the utilization of them and bank control pointers therefor are provided.

Furthermore, in a case where one ring bank is provided in which banks each including $\lambda_0$ registers are grouped in m banks and where one set of global banks is configured of n banks, the respective global banks being constructed of $\lambda_1, \lambda_2, \ldots$ and $\lambda_n$ registers, registers numbering $\lambda_0 \times m + \lambda_1 + \lambda_2 + \ldots + \lambda_n$ exist as a whole. In this case, the maximum number of registers $\lambda_0, \lambda_1, \lambda_2, \ldots$ and $\lambda_n$ can be assigned by the register displacement part of the instruction. Each bank of the ring bank is used in a form allocated to the corresponding one of the next levels of the nested subprogram calls while each global bank is used in a form allocated to the corresponding one of the tasks which are executed asynchronously. More specifically, as regards the ring bank, when the nest level of the subprogram call deepens by one, a bank at the next position in terms of the ring-shaped position is used as a current bank, and a bank having been used as a current bank till then is set as a previous bank. When the nest level shallows by one owing to the return from a subprogram, the ring-shaped position retracts by one to set a previous bank as a current bank, and a bank at the preceding position in terms of the ring-shaped position is set as a new previous bank. The global bank can have the allocation varied at the task switch, but in calling and returning a subprogram within an identical task, the allocation is held invariable and the content is not automatically saved and restored. One of the global banks is fixedly used by a system task for handling interruption etc., and that global bank shall be called the "system bank."

As a usage, information which is locally used within a single subprogram is put in the ring bank, while global information which is to be held beyond the partition of subprogram calls and temporal information which need not be saved and restored at the time of a subprogram call are put in the global bank. When information to be delivered to a subprogram of lower level is kept in the register of a current bank, the subprogram called can refer to it as the register of a previous bank. When information to be given as a function value or the like from a called subprogram back to a subprogram of higher level is kept in the register of a previous bank, it can be referred to as the register of a current bank after the time of a return.

As the bank control pointers, there are provided a current bank pointer for holding the position of a current bank under use, a previous bank pointer for holding the position of a previous bank, and a global bank pointer for holding the position of a global bank, and besides, a valid bank pointer indicating the boundary of valid information items, as well as a bank stack pointer indicating the saving location of a ring bank.

As the bank control instructions, there are provided an advance ring bank instruction and a retrieval ring bank instruction which control the advance and retraction of a ring bank, the automatic saving of valid information immediately before the destruction thereof and the automatic restoration of saved information immediately before reference thereto, a load bank status instruction and a store bank status instruction which execute the allocation of a global bank, the setting of ring bank control information and the assignment of a ring bank saving area, and a block transfer instruction which transfers bank contents collectively.

For the purpose of making it possible to assign that register among the registers of a current bank which is to hold its content at the time of any later ring bank advance or retraction, an indication vector is provided in which the bit i thereof is set at 1 if a register i corresponds thereto and at 0 if not, and the vector is held in the specific register of the current bank.

As an instruction scheme, the register fields of almost all instructions may specify the registers of global banks so that a program using only the global banks can also be created.

Further, there is provided a global bank mode in which the registers of the ring bank are treated equally to those of the global bank, thereby making it possible to increase the number of banks of the global bank, and a ring bank mode using the ring bank and the global bank mode are permitted to be changed-over by a program.

In order to avoid or relieve the save operations of the ring bank attendant upon the task switches, a plurality of ring banks are provided, and one ring bank and one global bank are allotted to each of a plurality of tasks. The tasks having the banks allotted thereto in such a way can be switched without performing save and restore processes for both the ring bank and the global bank.

In a case where the position of a register is expressed as a register address of a binary number, where the number of registers in each register area is made the power of 2 and where the value of an area register is set to be an integral times the power of 2, the position of the register to be actually used can be generated by an OR circuit on the basis of the value of the area register and a value specified in a register displacement part, therefore its processing can be increased in speed. In a case where register positions are expressed by binary numbers from 0 to $2^p - 1$, the succeeding register and preceding register of a register of register address i can be readily calculated as registers having register addresses $\mod(i+1, 2^p)$ and $\mod(i-1, 2^p)$, respectively. When, in a ring bank prepared by grouping $2^r$ register banks each of which consists of $2^q$ registers, the value of a bank control pointer is set to be an integral times as large as $2^q$, the succeeding bank and preceding bank of a bank beginning with an address $i \times 2^q$ can be readily calculated as banks having head register addresses $\mod((i+1) \times 2^q, 2^{p+q})$ and $\mod((i-1) \times 2^q, 2^{p+q})$, respectively.

In a case where the numbers of registers of the respective global banks of a global bank set are identical, to a fixed number $\lambda_1$, where the numbers of banks of respective ring banks are identical to a fixed number m and where the numbers of registers included in the respective banks of the ring bank are identical to a fixed number $\lambda_0$, one program can be run whichever global bank or ring bank is selected.

By fabricating the register block and the register access mechanism in one semiconductor chip as that of an arithmetic-logic unit, the frequency of the transfer of information between the semiconductor chip and the exterior thereof can be sharply lowered, and an increase in the speed of processing can be attained.

In the information processing apparatus of the present invention, the value of an area register is set in a part preceding the execution of an instruction using general registers, such as in the head part of one program or subprogram. In a case where a register area for use is changed according to the kind of information to be handled, different area registers may be used for the individual kinds of information. When an instruction having an area register part i and a register displacement part d comes under the condition that the value of an area register i is set at $A_i$, the address of a register which is actually used by the instruction becomes $A_i + d$. In case of synthesizing a register address by means of an OR circuit on the basis of the value of an area register and a register displacement value, a program is drawn up so that a register displacement value may be restricted to a numerical value which can be expressed by at most $\lambda'$ bits, $\lambda'$ denoting a number smaller than the bit length of a register displacement part, and that the value of the area register may be restricted to a numerical value the lower $\lambda'$ bits of which are 0's. Then, a synthesized value in the OR circuit becomes equal to an added value in an adder, so that no malfunction occurs.

The value of the area register can be set at any desired point of time without being restricted to the head part of the subprogram, etc. Therefore, when the program is to be run, the assignment of registers to be used can be changed at programmer's will in conformity with the use the of registers in the past and the requested use of registers in the future.

BRIEF DESCRIPTION OF THE DRAWINGS

FIGS. 2, 2(a), 2(b), 2(c), 2(d), 2(e) are format diagrams of the essential portions of instructions for the information processing apparatus of the present invention;

FIG. 5, 5(a) and 5(b) are a diagram showing the structure of a register block in FIG. 4;

DETAILED DESCRIPTION OF THE PREFERRED EMBODIMENTS

Figure 1:
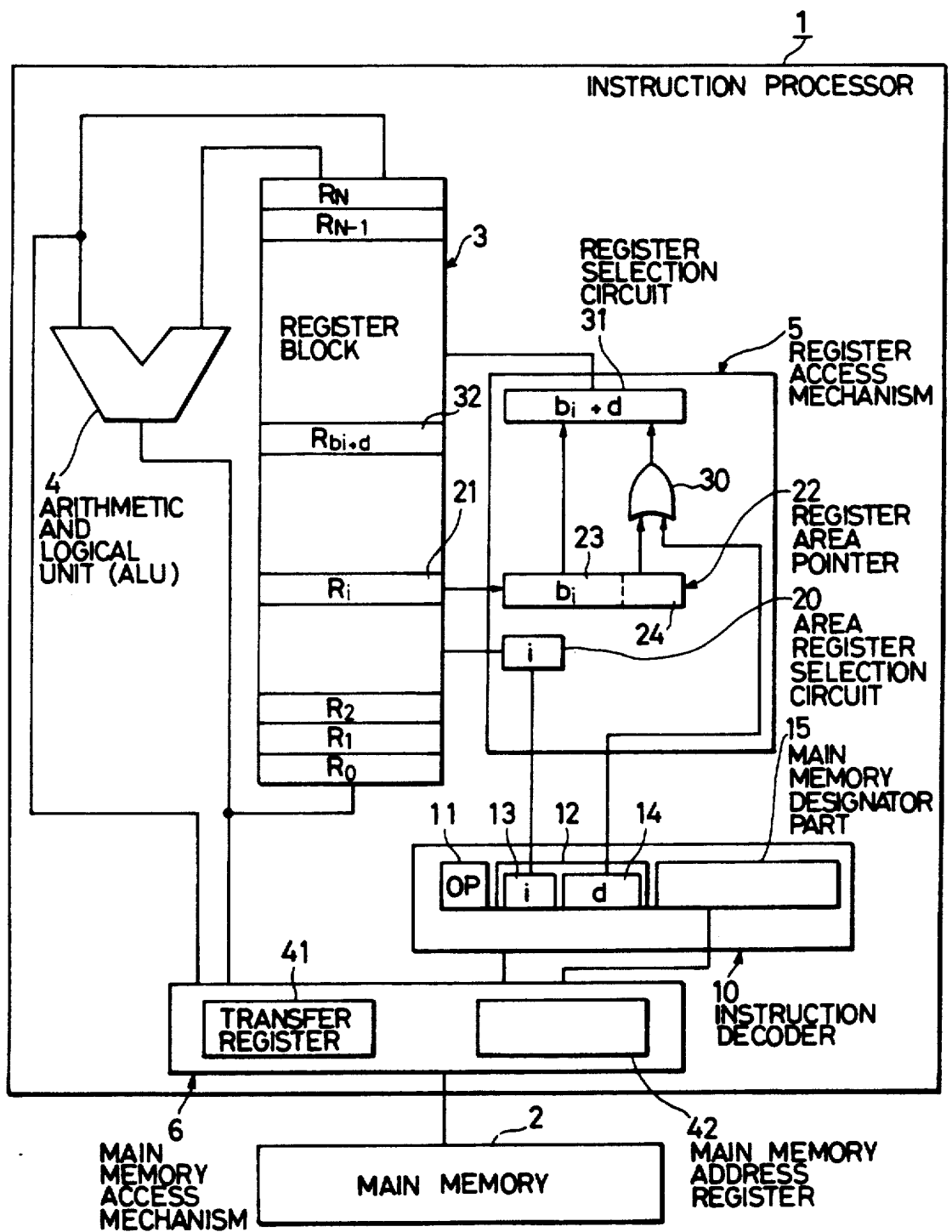
FIG. 1 is a block arrangement diagram of the first embodiment of an information processing apparatus according to the present invention.

Now, embodiments of the present invention will be described in detail with reference to the drawings.

First, an example of a method of use of register banks in the information processing apparatus of the present invention will be detailed, letting $\lambda$ denote the number of registers to be specified by the register displacement part of an instruction for the information processing apparatus, m denote the number of banks of a ring bank and n denote the number of banks of a global bank.

When starting a program, a bank status load instruction is used to set the value of a current bank pointer to 0, that of a previous bank pointer to $\lambda(m-1)$, that of a global bank pointer to a bank address allotted to the program, that of a valid bank pointer to $\lambda(m-1)$, and that of a bank stack pointer to a location which is used as a bank save area in the program.

When calling a subprogram, information items to be delivered as arguments to the subprogram are put in registers of a current bank, and a save indicator vector is put in the specific register of the current bank, whereupon an instruction sequence for invoking the subprogram is executed. In a case where the number of the arguments is too large to accommodate them in the registers of the current bank, an overflowing part is delivered through a memory.

In the called subprogram, an advance ring bank instruction is first executed. In the instruction, the value of a current bank pointer before the call is set as the new value of the previous bank pointer, and the directly succeeding bank address in terms of ring-shaped addresses (a bank address $i+\lambda$ if the value i of the current bank pointer before the call is smaller than $\lambda(m-1)$, and a bank address 0 if it is $\lambda(m-1)$) is set as the new value of the current bank pointer. On this occasion, the new previous bank pointer saves the content of a register block indicated by a save indicator vector among banks indicated by a valid bank pointer, into a location indicated by a bank stack pointer, and it advances the value of the valid bank pointer to the next bank address in terms of the ring-shaped addresses and advances the value of a bank stack pointer in conformity with the amount of the saved data. Unless the new value of the previous bank pointer reaches the valid bank pointer, bank saving by the advance ring bank instruction is not executed.

When utilizing the information items delivered as the arguments within the subprogram, an instruction for referring to the content of a register in the previous bank is given by the program. Information set in a current register specified by register displacement part value of i on a calling side can be referred to as the content of the previous register specified by register displacement part value of i on a called side. Information set in a global bank on the calling side can be utilized as it is on the called side.

In returning from the subprogram, information to be given back to the calling side, such as a function value, is first set in the previous register if necessary. Thereafter, a retract ring bank instruction is executed. This instruction functions to set the value of a previous bank pointer before the return, as the value of a new current bank pointer, and to set the preceding ring-shaped address $(i-\lambda$ if the address i of a new previous bank pointer is greater than 0, and $\lambda(m-1)$ if it is 0) as the new value of the previous bank pointer. On this occasion, when the new value of the current bank pointer becomes equal to that of the valid bank pointer, the content of a bank save area indicated by the previous bank pointer is transferred, thereby to restore the content, while the new value of the previous bank pointer is set as that of the valid bank pointer, and a bank stack pointer is retracted in conformity with the amount of the transfer. A save indicator vector indicating a register to which the content is to be transferred is contained in the head part of the data which is transferred from the bank save area.

When an exception, such as an interrupt, has occurred, an execution instruction address at that time is pushed into a stack by the use of the stack pointer of a system bank, and thereafter, the processing system begins the execution of an exception processing program, corresponding to the type of the exception. In the exception processing program, the values of a current bank pointer, a previous bank pointer and a bank stack pointer at the occurrence of the exception are saved by a store bank status instruction, whereupon values to be used in the exception processing program are set in the pointers by a load bank status instruction.

In task caused by such software as an operating system or the like, the values of the current bank pointer, the previous bank pointer, the global bank pointer, the valid bank pointer and the bank stack pointer for the current task are saved according to a store bank status instruction, and thereafter, the values of the pointers are set for the next task by the a load bank status instruction. At that time, in a case where one ring bank is shared with another task, the content of the ring bank is also saved and restored by the a block transfer instruction.

In this way, the saving and restoration of registers attendant upon the subprogram reference are generated only rarely, thereby effecting an increased operating speed is attained.

It is also possible to run a program using only global banks without employing a ring bank. Therefore, when the program thus created is run as a task, the save and restore processes of the ring bank are unnecessary. If such a task has the global banks separately allotted thereto so as not to compete with another task, it does not require the saving and restoration of registers at all. If an interrupt processing program or the like is constructed in such a form, the speed of processing is rendered very high. A large number of such tasks can be processed by utilizing a global bank mode in which the ring bank can be treated equally to the global banks.

Even in the case of using the ring bank, in a small subprogram which uses few registers, the advance ring bank instruction at the head part thereof and the retract ring bank instruction at the tail part thereof need not always be provided, but they can be omitted so as to realize a high-speed subprogram reference. Regarding a task which shares neither the global banks nor the ring bank with another task, both the content of the global bank and the content of the ring bank are held without any change even when the task is switched. Therefore, when the task is restarted, processing can be restarted immediately from a break point.

FIG. 1 is an arrangement digram of the essential portions of an information processing apparatus showing the first embodiment of the present invention.

The principal constituents of the information processing apparatus in the first embodiment are an instruction processor 1 and a main memory 2. The instruction processor 1 includes therein a register block 3 consisting of a large number of operating registers $R_0, R_1, R_2, \ldots$ and $R_N$, an arithmetic-logic unit 4, a register access mechanism 5, a main memory access mechanism 6, and an instruction decoder 10. The main memory address space of the main memory 2 and the register address space of the register block 3 define separate address spaces. In the present embodiment, register addresses are expressed by binary integers of L bits, $0, 1, 2, \ldots$ and $2^L - 1$, and $N = 2^L - 1$ holds. There are an area register selection circuit 20, a register area pointer 22, an OR circuit 30 for synthesizing a register address, and a register selection circuit 31 in the register access mechanism 5, and there are a transfer register 41 and a main memory address register 42 in the main memory access mechanism 6.

The instruction decoder 10 extracts instructions from an instruction sequence directly given by a user as an instruction sequence for this information processing apparatus or from an instruction sequence generated by a language processor, in a predetermined order from the main memory 2, and it subjects each individual instruction to processes corresponding to the roles of the respective constituent parts of the instruction. A typical instruction has an operation code part 11 indicating the kind of an operation, a register designator part 12 and a main memory designator part 15. The register designator part 12 further includes an area register part 13 and a register displacement part 14 having a length of $\lambda$ bits. Letting i denote the value of the area register part 13 of a certain instruction, the value i is sent to the area register selection circuit 20 of the register access mechanism 5, and the $R_i$ register 21 in the register block 3 is selected as an area register. Letting $b_i$ denote the content of the $R_i$ register 21, the value $b_i$ is sent to the register area pointer 22. While the bit length of the register displacement part 14 has been denoted by $\lambda$, the register selection circuit 31 is supplied with a logical sum obtained by inputting the content of the lower $\lambda$ bit part 24 of the register address of L bits and that of the register displacement part 14 to the OR circuit 30. In addition, the upper $(L - \lambda)$ bits of the register address are set as the value itself of the upper $(L - \lambda)$ bit part 23 of the register area pointer 22.

When the value of the area register 21 is expressed by $b_i$ and a binary number whose lower $\lambda$ bits are 0's is set beforehand, the register address synthesized by the OR circuit 30 as stated above becomes equal to the arithmetical sum $b_i + d$ between the value $b_i$ and the value d of the register displacement part 14. The lower $\lambda$ bits of the content of the, area register 21 need not always be set at 0's. Let $\lambda'$ denote a number equal to or smaller than the bit length $\lambda$ of the register displacement part 14, the content of a certain area register is set at a number with its lower $\lambda'$ bits being 0's. In an instruction wherein the address of the area register is used in the area register part 13, if the value of the register displacement part is limited to numbers expressible with $\lambda'$ bits, the register No. synthesized by the OR circuit 30 as described above becomes equal to a value obtained by taking the arithmetical sum between both the values of the area register, and the register displacement part. What value is to be set as the number $\lambda'$ for limiting the value to be put in the register displacement part 14 can be selected by software. Therefore, the value $\lambda'$ can be varied depending on an area register. Moreover, even for one area register, it can be varied depending upon the time of use.

Now, when the register No. $b_i + d$ is synthesized in the above way out of the value $b_i$ of the area register 21 selected by a certain instruction and the value d of the register displacement part 14 and is sent to the register selection circuit 31, the $(R_{b_i} + d)$ register 32 of register address $b_i + d$ is selected as a register for use in the instruction. If the content of the operation code part 11 of the instruction indicates an instruction whose operand is the content of the selected register, then the content of the register $R_{b_i} + d$ is sent to the ALU 4, and the operation is executed there. On the other hand, if the content of the operation code part 11 indicates an instruction the result register of which is the selected register, then a result from the ALU 4 is put in the register $R_{bi}+d$. If the content of the operation code part 11 is a load instruction, the content of a main memory address indicated by the main memory designator part 15 is put in the register $R_{bi}+d$, and if it indicates a store instruction, the content of the register $R_{bi}+d$ is stored in a main memory of the address indicated by the main memory designator part 15. The transfer register 41 in the main memory access mechanism 6 is a register for temporarily holding information which is transferred between the main memory 2 and the instruction processor 1, while the main memory address register 42 is a register for temporarily holding the address of the main memory 2 which is selected at that time.

In this embodiment, as regards an instruction in which the content of the area register part 13 is 0, the content d of the register displacement part 14 is sent to the register selection circuit 31 without any change, and the register whose register address is d is selected as a register for use in the instruction. That is, a register area in which the register address begins from 0 is utilized as a specific register area for an area register. It is accordingly possible to set or refer to the value of the area register by the use of the instruction having an area register part 13 which is 0.

FIGS. 2(a)-2(e) are format diagrams of instructions for the information processing apparatus of the present invention. It shows various instruction forms concerning an operation code as well as a register address and the designation of a main memory address in each instruction for the information processing apparatus. As the constituent parts of the instructions, there are a part indicative of additional information, a part indicative of a constant for use, etc. besides the parts illustrated in these figures.

Figure 2A:
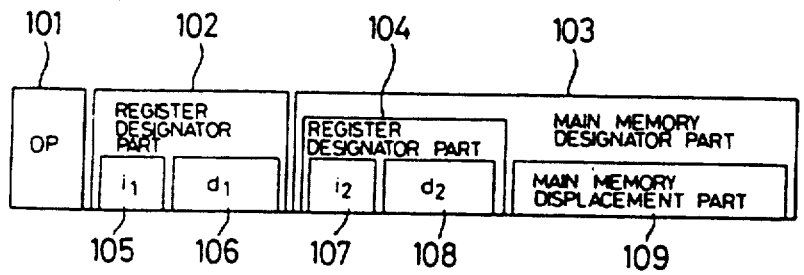

FIG. 2(a) shows the format of an instruction which includes an operation code part 101, a register designator part 102 and a main memory designator part 103. There are an area register part 105 and a register displacement part 106 in the register designator part 102, and a register to be used is selected in the same way as elucidated in FIG. 1. Also in the main memory designator part 103, there are a register designator part 104 for designating a base register and a main memory displacement part 109 for designating a relative address to the value of the base register. In this instruction, the register address b of the register for use is found in the above way on the basis of an area register part 107 and a register displacement part 108, and B+D obtained by adding the content B of the register $R_b$ of that address and the value D of the main memory displacement part 109 is set as the address of the main memory for use in the instruction.

Figure 2B:
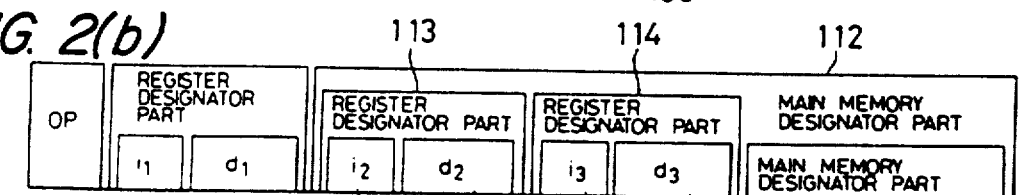

FIG. 2(b) shows an instruction the main memory designator part 112 of which includes a register designator part 113 for designating a base register, a register designator part 114 for designating an index register, and a main memory displacement part 121. In this instruction, a register $R_b$ to be used as the base register is found in the foregoing way on the basis of an area register part 117 and a register displacement part 118 on one side, while a register $R_x$ to be used as the index register is found in the foregoing way on the basis of an area register part 119 and a register displacement part 120 on the other side, and an address obtained by taking the arithmetical sum of the three, the content of the base register $R_b$, the content of the index register $R_x$ and the value of the main memory displacement part 12 is set as the address of the main memory 2 for use in the instruction.

Figure 2C:
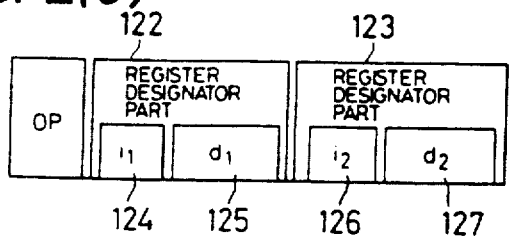

FIG. 2(c) shows the format of an instruction which uses two registers. In the instruction, a register address found in the foregoing way on the basis of the area register part 124 and register displacement part 125 of one register designator part 122 is used to specify the address of the first register, while a register address found in the foregoing way on the basis of the area register part 126 and register displacement part 127 of the other register designator part 123 is used to specify the address of the second register, and processing is executed by the use of the first and second registers.

Figure 2D:
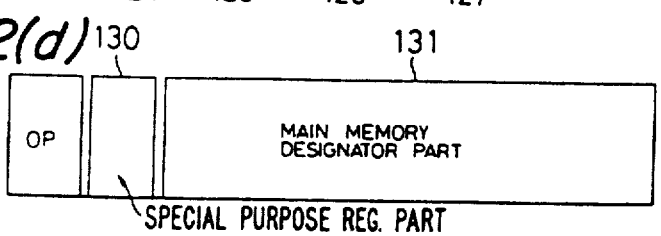

FIG. 2(d) shows an instruction according to which, in case of using a special-purpose register area as an area register, the value of the special-purpose area register is stored in the main memory. This instruction includes a special-purpose register part 130 for designating the address of the special-purpose area register, and a main memory designator part 131.

Figure 2E:
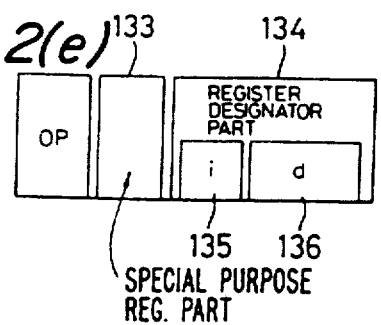

FIG. 2(e) shows an instruction which uses a special-purpose area register and a general register. In the instruction, a special-purpose register part 133 and a general register part 134 are included, and the registers are selected in the foregoing form by the use of an area register part 135 and a register displacement part 136.

Figure 3:
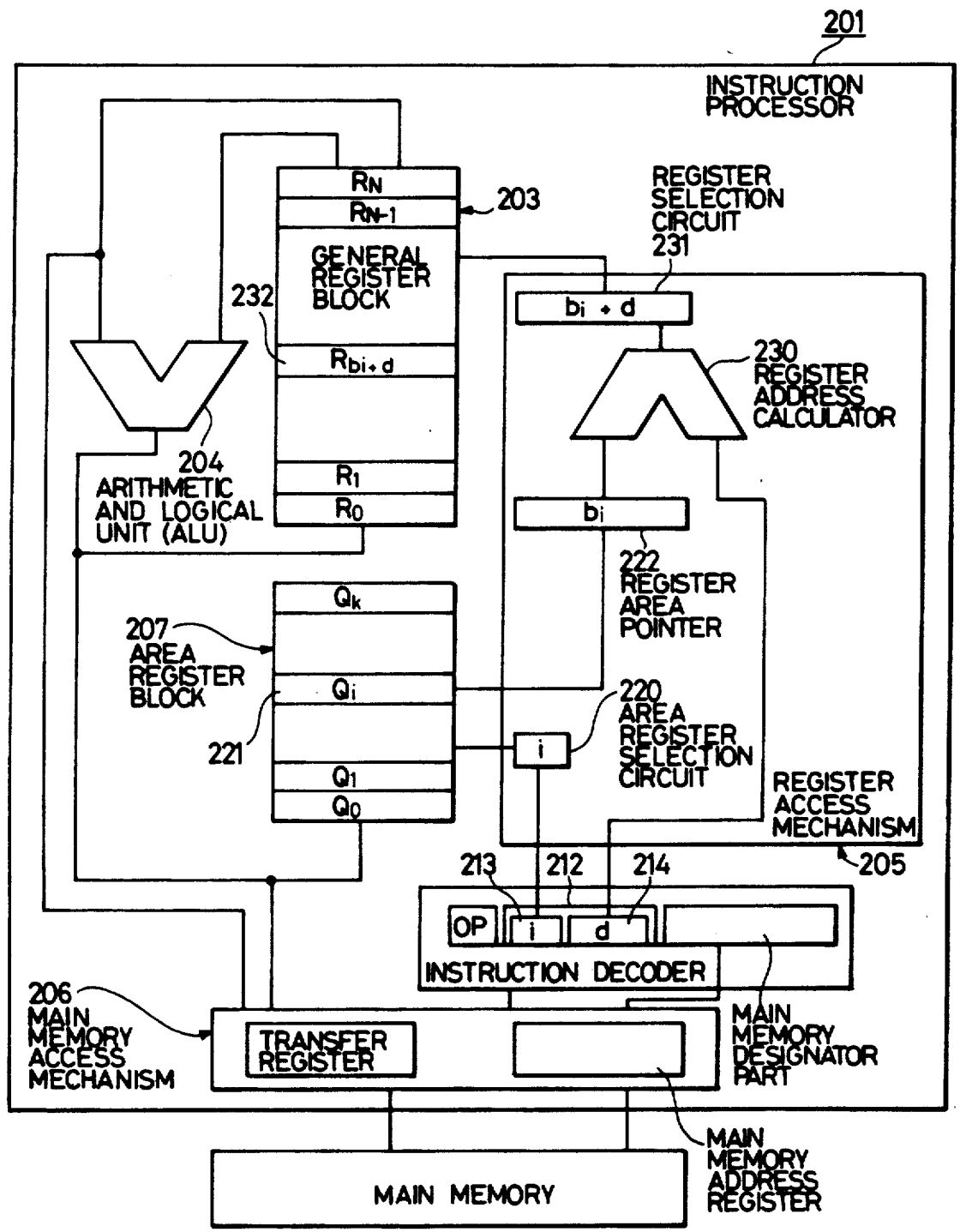
FIG. 3 is an arrangement diagram of the essential portions of an information processing apparatus showing the second embodiment of the present invention.

FIG. 3 is an arrangement diagram of the essential portions of an information processing apparatus showing the second embodiment of the present invention. In this embodiment, an area register block 207 which is a set of special-purpose area registers is disposed separately from a general register block 203 within an instruction processor 201. The general register block 203 is composed of general registers $R_0$, $R_1$, ... and $R_N$, while the area register block 207 is composed of area registers $Q_0$, $Q_1$, ... and $Q_K$. When the content i of an area register part 213 included in the register designator part 212 of an instruction is sent to an area register selection circuit 220 in a register access mechanism 205, the content $b_i$ of the area register ($Q_i$) 221 in the area register block 207 is sent to a register area pointer 222. This content $b_i$ of the area register $Q_i$ and the content d of the register displacement part 214 of the instruction are added by a register address calculator 230, and the sum value $b_i+d$ is sent to a register selection circuit 231. As a result, the ($R_{bi}+d$) register 232 is selected from within the general register block 203 as a register for use in this instruction. The other portions such as an AALU 204 and a main memory access mechanism 206 are the same as in the first embodiment described with reference to FIG. 1.

Figure 4:
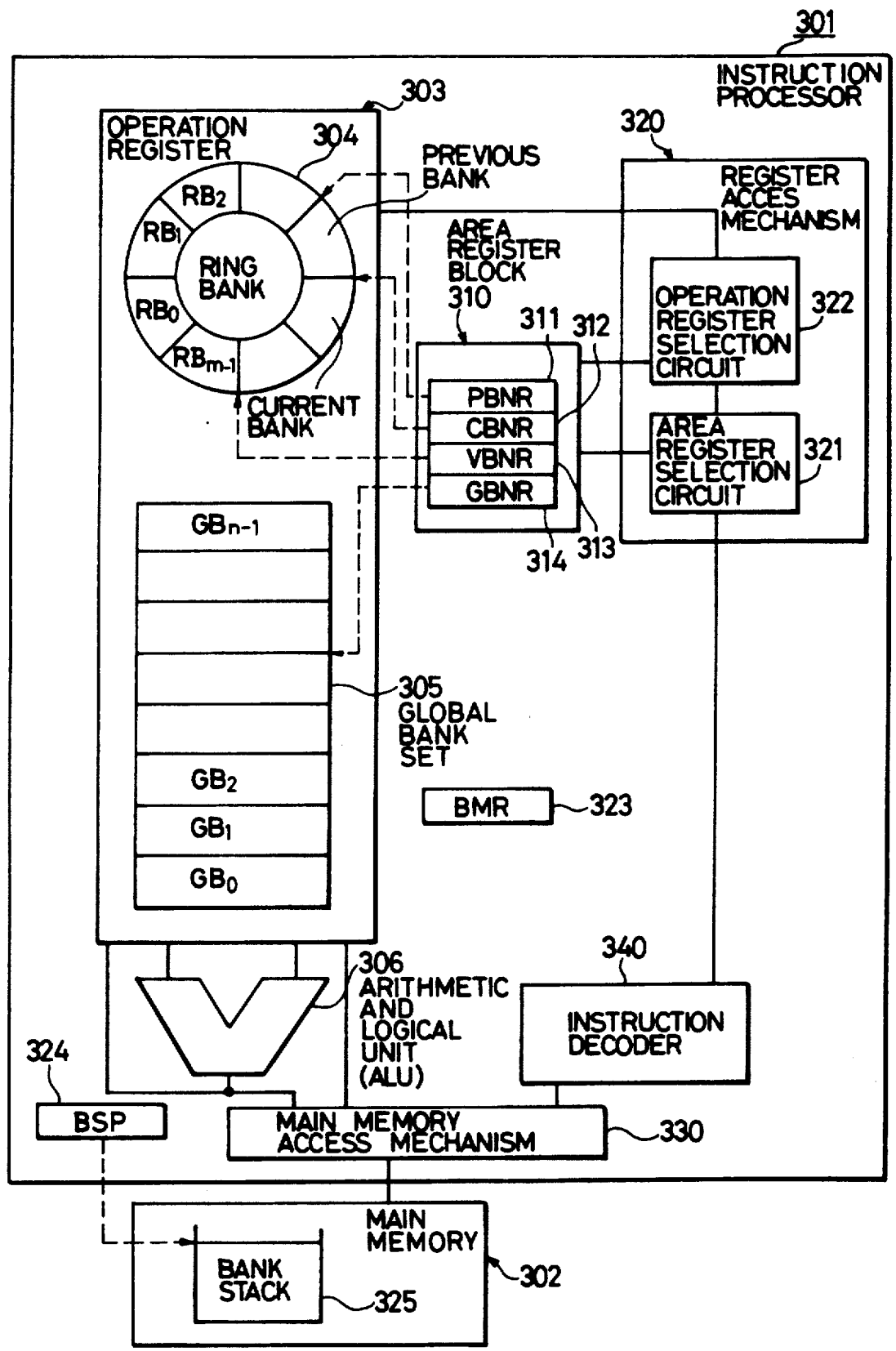
FIG. 4 is an arrangement diagram of essential portions in the third embodiment of the present invention.

FIG. 4 is an arrangement diagram of the essential portions of an information processing apparatus showing the third embodiment of the present invention. The principal portions of the information processing apparatus in this embodiment are an instruction processor 301 and a main memory 302. The instruction processor 301 includes therein an operation register block 303, an ALU 306, an area register block 310, a register access mechanism 320, a main memory access mechanism 330, an instruction decoder 340, and a bank stack pointer (BSP) 324. The operation register block 303 includes therein a ring bank 304 and a global bank set 305. The area register block 310 includes therein four area registers, namely, a previous bank pointer (PBNR) 311, a current bank pointer (CBNR) 312, a valid bank pointer (VBNR) 313 and a global bank pointer (GBNR) 314. In order to realize the function of keeping the content of the ring bank 304, there are disposed the bank stack pointer (BSP) 324 and a bank stack 325 allocated in the main memory 302. Further, there is the bank mode register (BMR) 323 which indicates a bank use mode. Broken lines in FIG. 4 exemplify the pointers for the area registers and the bank stack pointer.

Figure 5A:
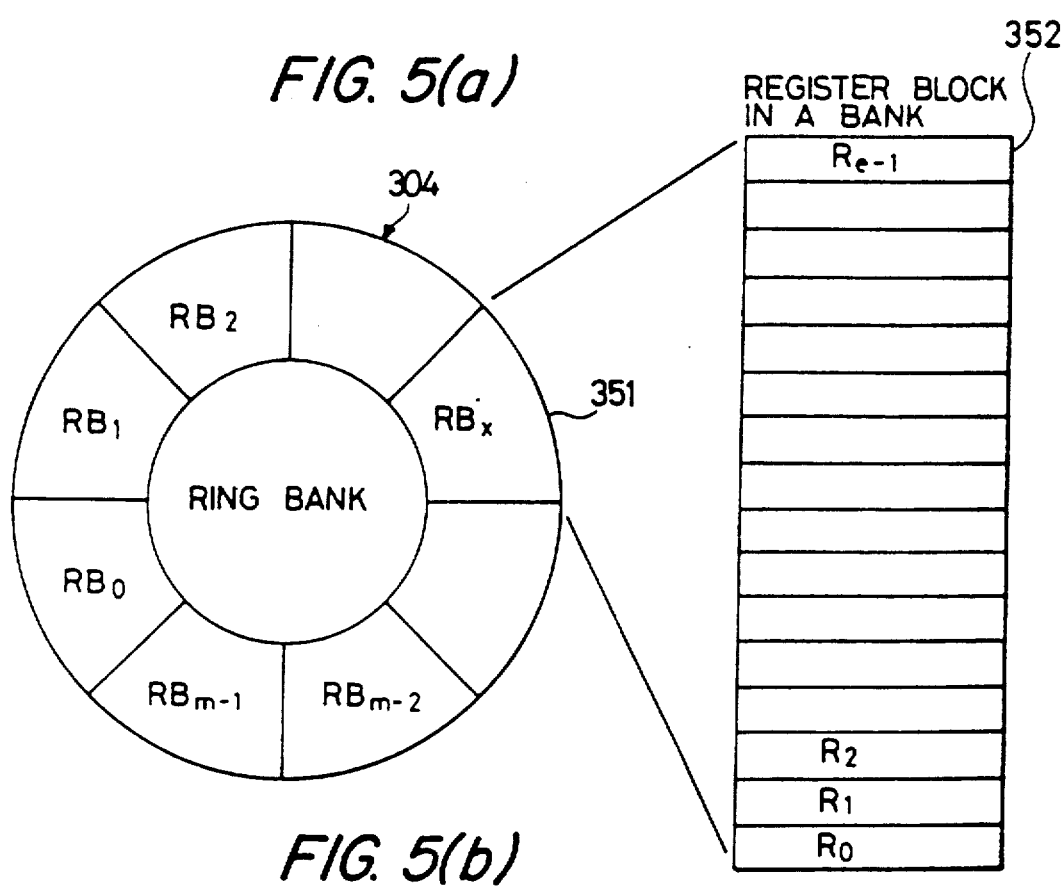
Figure 5B:
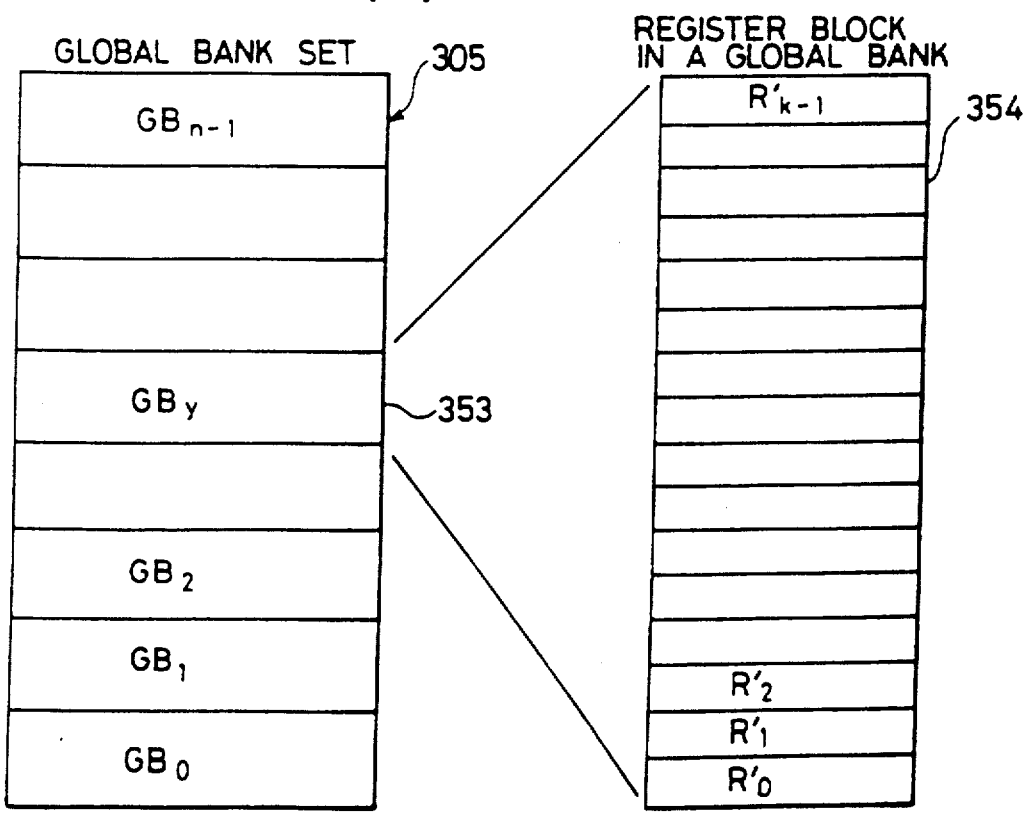

FIGS. 5(a) and 5(b) are diagrams showing the arrangements of register blocks in FIG. 4. As illustrated in FIG. 5(a), the ring bank 304 is configured of m banks $RB_0, RB_1, RB_2, \ldots$ and $RB_{m-1}$, each of which is composed of $\lambda$ registers $R_0, R_1, R_2, \ldots$ and $R_{\lambda-1}$. Here, $RB_x$ at numeral 351 denotes any desired one of the banks, and numeral 352 denotes the register block in the bank.

As illustrated in FIG. 5(b), the global bank set 305 is configured of n global banks $GB_0, GB_1, GB_2, \ldots$ and $GB_{n-1}$, each of which is composed of k registers $R_0', R_1', R_2', \ldots$ and $R_{k-1}'$. Here, $GB_y$ at numeral 353 denotes any desired one of the banks, and numeral 354 denotes the register block in the global bank.

With this information processing apparatus as the third embodiment, the number of banks m of the ring bank 304 and the number of banks n of the global bank set 305 can be altered during the running time of the information processing apparatus. That is, there are instructions for changing the number of banks m of the ring bank 304 to, e.g. 0, 4 and 8 and for changing the number of banks n of the global bank set 305 to, e.g., 2, 4, 8 and 16. A case where the number of banks of the ring bank 304 is greater than 1 is called the "ring bank mode," while a case where the number of banks of the ring bank 304 is 0 and where only the banks of the global bank set can be used is called the "global bank mode." The status of the apparatus concerning the number of banks of the ring bank 304 and the number of banks of the global bank set 305 is indicated by the bank mode register 323. As will be described later, there are instructions which set the contents of control registers and with which the bank mode can be altered, whereupon the bank mode register 323 changes so as to indicate the bank mode at the time of the alteration.

In the ensuing description, the operation in the ring bank mode will be first elucidated, and the operation in the global bank mode will be thereafter elucidated.

Figure 6:
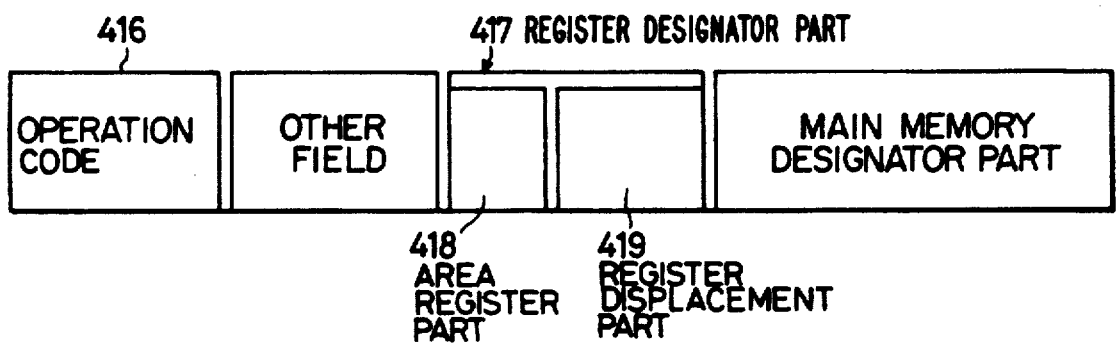
FIG. 6 is a diagram of the register designator part of an instruction in the fourth embodiment of the present invention.

FIG. 6 is a diagram showing the register designator part of an instruction in the fourth embodiment of the present invention. Many of instructions for this information processing apparatus have the register designator part 417 besides an operation code part 416 as illustrated in FIG. 6. The register designator part 417 includes therein an area register part 418 for indicating any of a global bank, a current bank or a previous bank in which a register to be used by the instruction is contained, and a register displacement part 419 for indicating a relative address within the bank. In the register displacement part 419, a number from 0 to $(\lambda-1)$ is designated. In some instructions, the register to be used is fixed to any one of the global bank, the current bank or the previous bank. On that occasion, the area register part 418 is sometimes omitted from the indication in the instruction.

Regarding an instruction in which the content of the register displacement part 419 is an integer value i from 0 to $(\lambda-1)$, if the area register part 418 designates the global bank, a register i within a bank indicated by the global bank pointer 314 in FIG. 4 is used; if the area register part 418 designates the current bank, a register i within a bank indicated by the current register pointer 312 is used; and if the area register part 418 designates the previous bank, a register i within a bank indicated by the previous bank pointer 311 is used.

In the ring bank mode in which the number of registers of the ring bank is greater than 1, the values of bank control pointers such as the current bank pointer must be initialized. To this end, a bank status load instruction BSL or a control register load instruction MTCR is used.

Figure 7:
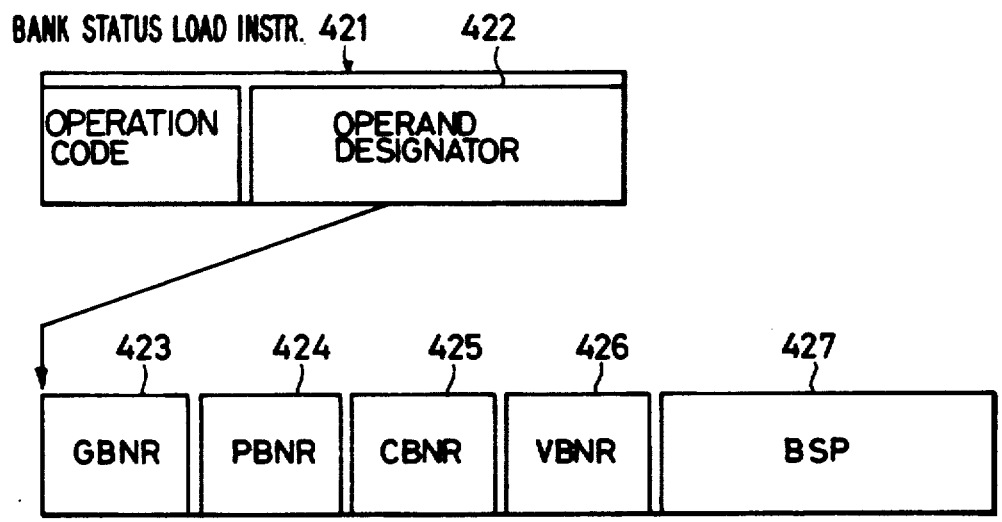
FIG. 7 is a diagram of one format of a bank status control instruction in FIG. 6.

FIG. 7 is a diagram showing one format of the bank status control instruction. As illustrated in FIG. 7, a bank status load instruction 421 has an operand designator part 422. In using this, five fields 423, 424, 425, 426 and 427 are provided in the memory. Bank No. to be put in the global bank pointer 314 is contained in the field 423 beforehand, bank No. to be put in the previous bank pointer 311 is contained in the field 424, bank No. to be put in the current bank pointer 312 is contained in the field 425, information to be put in the valid bank pointer 313 is contained in the field 426, and a location to be put in the bank stack pointer 324 is contained in the field 427. The head position of the series of fields is designated by the operand designator part 422. When the bank status load instruction 421 is executed under this state, the values of the fields 423 to 427 are set as the values of the bank control registers in accordance with the above correspondence. When a bank status store instruction is executed, the five pointers at the time of the execution are stored in memory positions indicated by the operand designator part 422 of the instruction as indicated at numerals 423, 424, 425, 426 and 427 in FIG. 7.

Figure 8:
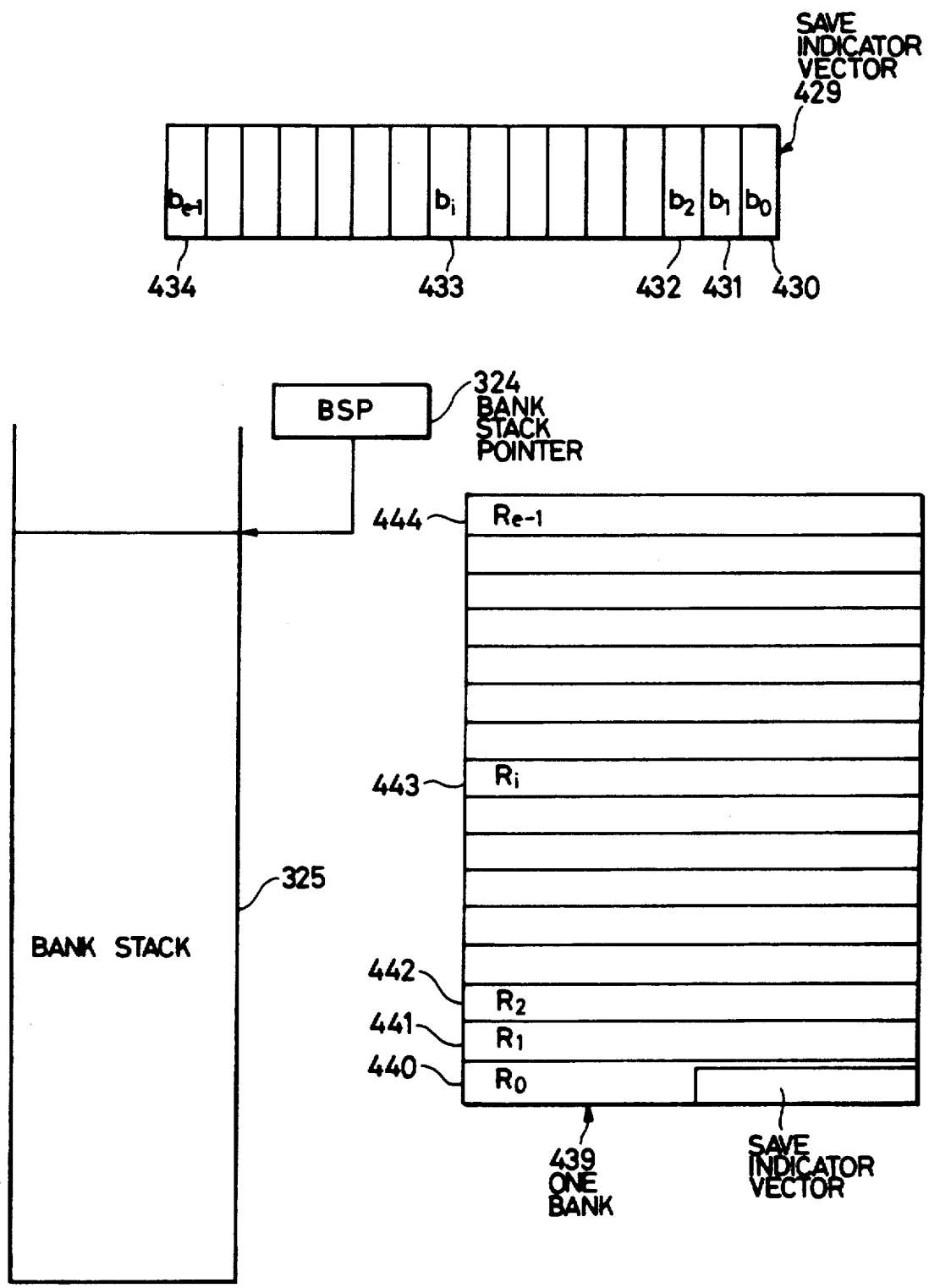
FIG. 8 is a diagram for explaining in detail the save and restore of a register bank in the present invention.

FIG. 8 is a detailed explanatory diagram of the save and restore operations of a register bank in the present invention.

As instructions pertaining to the call of a subprogram, an advance ring bank instruction and a retrieve ring bank instruction exist besides a call instruction and a return instruction. At the subprogram call, information to be delivered as an argument is set in the register of a current bank, whereupon information called a save indicator vector as shown at numeral 429 in FIG. 8 is set in the 0th register 440 of the current bank 439, namely, a bank indicated by the current bank pointer 312. The save indicator vector 429 is information having a length of $\lambda$ bits where $\lambda$ denotes the number of registers in each bank. Letting i denote an integer value from 0 to $(\lambda-1)$, the value of the i-th bit $b_i$ at numeral 433 in the save indicator vector 429 is "1" if the content of the i-th register $R_i$ at numeral 443 in the current bank 439 is to be saved, and the value is "0" if the content need not be saved. The 0th $b_0$ at numeral 430 is always set to "1." When the call instruction is executed after setting the save indicator vector in the 0th register $R_0$ 440 of the current bank, an address next to the instruction is stacked in a stack for subprogram reference, and the execution of the instruction sequence of the designated subprogram is started.

At the head of the instruction sequence of the subprogram, the advance ring bank instruction is executed. When the advance ring bank instruction is executed, the values of the current bank pointer (CBNR) 312 and the previous bank pointer (PBNR) 311 in FIG. 4 advance, and if necessary, also the values of the valid bank pointer (VBNR) 313 and the bank stack pointer (BSP)

324 change. Hereinbelow, the functions of the advance ring bank instruction will be elucidated using symbols $CBNR_1$, $PBNR_1$, $VBNR_1$ and $BSP_1$ which denote the values of the four pointers before the execution of the advance ring bank instruction, respectively, and symbols $CBNR_2$, $PBNR_2$, $VBNR_2$ and $BSP_2$ which denote the values of the four pointers after the execution of the advance ring bank instruction, respectively. In executing the advance ring bank instruction, first of all, the value $CBNR_1$ which indicates the current bank before the execution of this instruction is set as the value $PBNR_2$ of the previous bank pointer after the execution of the instruction, and the value of the current bank pointer is updated to a value $mod(CBNR_1+1, m)$. Here, the $mod(a, b)$ denotes a remainder obtained by dividing an integer a by an integer b, and m denotes the number of registers within one bank. On this occasion, if $CBNR_1=VBNR_1$ holds, that is, if the value of the current bank pointer before the updating is equal to that of the valid bank pointer before the updating, then among the registers of a bank indicated by the value $CBNR_2$ of the current bank pointer after each updating, the register indicated by the save indicator vector contained in the 0th register of the indicated bank has its content selectively saved in a place indicated by the bank stack pointer $BSP_1$.

Further, the mechanism of this bank saving will be detailed with reference to FIG. 8. In the bank 439 indicated by the current bank pointer $CBNR_2$ after the updating, there are $\lambda$ registers; the 0th register $R_0$ 440, the first register $R_1$ 441, the second register $R_2$ 442, ... and the $(\lambda-1)$-th register $R_{\lambda-1}$ 444. Also in the save indicator vector 429, there are $\lambda$ bits; the 0th bit $b_0$ 430, the first bit $b_1$ 431, the second bit $b_2$ 432, ... and the $(\lambda-1)$-th bit $b_{\lambda-1}$ 434. If, for $0 \leq i \leq \lambda-1$, the content of the i-th register 443 is to be saved, the i-th bit $b_i$ 433 of the save indicator vector is set to "1" beforehand, and if the content need not be saved, the bit $b_i$ is set at "0." This save indicator vector 429 is stored in the 0th register $R_0$ 440 of the bank 439. If the value $CBNR_1$ of the current bank pointer before the updating, namely, the value $PBNR_2$ of the previous bank pointer after the updating is equal to the value $VBNR_1$ of the valid bank pointer before the updating, then the save indicator vector 429 which is stored in the 0th register $R_0$ 440 of the new current bank 439 indicated by the value $CBNR_2$ of the current bank pointer after the updating is scanned in a direction from the bit $b_{\lambda-1}$ 434 toward the bit $b_0$ 430. If the bit $b_i$ for $0 \leq i \leq (\lambda-1)$ is "1", the value of the bank stack pointer (BSP) 324 is advanced in the amount of one register, and the content of the register $R_i$ is stored in a position indicated by the new value of the bank stack pointer in the bank stack 325. If the bit $b_i$ is "0", the bank stack pointer 324 is not advanced, and the store of the register $R_i$ is not executed, either. The value of the bank stack pointer 324 at the time at which the save indicator vector 429 has been scanned while changing i to $\lambda-1, \lambda-2, \ldots, 2, 1$ and 0 and the necessary register store operations have been repeated, is the value $BSP_2$ updated by the advance ring bank instruction. Since the 0th bit $b_0$ of the save indicator vector is always set at "1", the value of the register $R_0$ of the saved bank is stored in a position indicated by the bank stack pointer after the updating, namely, the uppermost part of the bank stack 325.

When this bank save operation has ended, the new value $VBNR_2$ of the valid bank pointer 313 is set at $VBNR_2=mod(CBNR_1+1, m)$ on the basis of the value $VBNR_1$ thereof before the updating.

Unless the value $PBNR_2$ of the previous bank pointer after the updating is equal to the value $VBNR_1$ of the valid bank pointer before the updating, the bank save operation described above is not performed, and the values of the bank stack pointer 324 and the valid bank pointer 313 do not change.

The above are the functions performed by the advance ring bank instruction.

In returning from the subprogram, a function value or the like to be given back to a calling side is set in the register of the current bank if it is necessary, and thereafter the retrieve retract ring bank instruction is executed, followed by the execution of the return instruction. When the retract ring bank instruction is executed, the values of the current bank pointer CBNR 312 and the previous bank pointer PBNR 311 retracted, and the values of the valid bank pointer VBNR 313 and the bank stack pointer BSP 324 change if it is necessary. Hereinbelow, the functions of the retract ring bank instruction will be elucidated using symbols $CBNR_3$, $PBNR_3$, $VBNR_3$ and $BSP_3$ which denote the values of the four pointers before the execution of this instruction, respectively, and symbols $CBNR_4$, $PBNR_4$, $VBNR_4$ and $BSP_4$ which denote the values of the four pointers after the execution of the instruction same, respectively.

In the execution of the retract ring bank instruction, first of all, the value $PBNR_3$ of the previous bank pointer 311 before updating is set as the new value $CBNR_4$ of the current bank pointer 312, and the value of the previous bank pointer is updated so as to establish $PBNR_4=mod(PBNR_3-1, m)$. If the value $CBNR_4$ of the current bank pointer after the updating is the same as the value $VBNR_3$ of the valid bank pointer 313 before the updating, then the content of a bank indicated by the value $PBNR_4$ of the previous bank pointer after the updating is selectively restored by information indicated by the bank stack pointer 324 in the bank stack 325.

The mechanism of this bank restoration will be described with reference to FIG. 8. First, the content of the uppermost part of the bank stack 325 indicated by the value $BSP_3$ of the bank stack pointer 324 before the updating is put in the 0th register $R_0$ of a bank indicated by the value $PBNR_4$ of the previous bank pointer 311 after the updating, and the value of the bank stack pointer 324 is retracted in the amount of one register. In the uppermost part of the bank stack 325, the save indicator vector 429 has been faced at the time of the subprogram call. With the above operations, therefore, the save indicator vector 429 is put in the $R_0$ register 440. Subsequently, the content of the save indicator vector 429 is scanned in a direction from the $b_1$ bit 431 toward the $b_{\lambda-1}$ bit 434. If the value of the $b_i$ bit 433 for $1 \leq i \leq \lambda-1$ is "1," the data of a position indicated by the new value of the bank stack pointer 324 within the bank stack 325 is transferred to the $R_i$ register 443, and the value of the bank stack pointer 324 is retracted in the amount of one register. If the value of the $b_i$ bit is "0," the transfer to the $R_i$ register 443 is not performed, and the bank stack pointer 324 is not retracted, either. The value of the bank stack pointer 324 obtained as the result of repeating these operations $(\lambda-1)$ times while changing i to 1, 2, 3, ... and $\lambda-1$ is the value $BSP_4$ thereof after the updating by the retract ring bank instruction. Thereafter, the value of the valid bank pointer 313 is retracted by one. That is, $VBNR_4 = mod(VBNR_3 - 1, m)$ is established. This value is the same as the value of the previous bank pointer after the updating.

Unless the value $CBNR_4$ of the current bank pointer after the updating is equal to the value $VBNR_3$ of the valid bank pointer before the updating, the bank restore operation described above is not performed, and the values of the bank stack pointer 324 and the valid bank pointer 313 are not changed, either.

The above are the functions performed by the retract ring bank instruction.

In the return instruction, a return address is taken out of the subprogram reference stack, and the execution of an instruction lying in a place designated by the return address is started.

In task switches, it is sometimes required to collectively save and restore the contents of the ring bank. To this end, a bank block store instruction and a bank block load instruction are provided as block transfer instructions.

In the bank block store instruction, the contents of banks from the next bank of a bank indicated by the valid bank pointer VBNR, to a bank indicated by the current bank pointer CBNR, are stored in the bank stack by the same processing as the bank save operation in the advance ring bank instruction. The operation will be detailed below.

When the bank block store instruction is executed, it is first checked whether or not the value VBNR of the valid bank pointer 313 is equal to the value CBNR of the current bank pointer 312. If they are not equal, the next bank of a bank indicated by the value VBNR, namely, a bank indicated by $mod(VBNR + 1, m)$ has its content stored in the bank stack by the same operation as the bank save operation stated in the description of the advance ring bank instruction. As a result, the value BSP of the bank stack pointer 324 advances, and the value VBNR of the valid bank pointer 313 advances to the next bank. As to the new value VBNR, whether or not it is equal to the value CBNR of the current bank pointer is checked. If it is not equal, the above bank save operation is repeatedly performed. When the value of the current bank pointer has become equal to that of the current bank pointer, or when it is equal from the beginning, the execution of the bank block store instruction is ended without performing the bank save operation.

The bank block load instruction is an instruction according to which the contents of the previous bank and the current bank stored by the bank block store instruction are taken out to the respective banks. In executing this instruction, the valid bank pointer and the current bank pointer have the same value. When the bank block load instruction is executed, the same bank restore operation as stated in the description of the bank retract ring bank instruction functions to first restore the content of a bank indicated by the current bank pointer 312 and to subsequently restore the content of a bank indicated by the previous bank pointer 311. As a result, the value of the valid bank pointer becomes the same as that of the previous bank pointer.

As instructions for altering a bank status, there are a control register load instruction MTCR and a control register store instruction MFCR which alter control information indicating the status of the ring bank or the global bank, and which can also be used. With the two instructions, it is possible to individually set and individually refer to the respective values of the current bank pointer 312, previous bank pointer 311, valid bank pointer 313, global bank pointer 314, bank stack pointer 324 and bank mode register 323 in FIG. 4. When the content of the bank mode register 323 is changed, the number of banks of the ring bank and the number of banks of the global bank set can be changed. When the number of banks of the ring bank is set at 0, the global bankmode is established in which all the banks can be used as global banks. That is, in the global bank mode, banks having been used as the ring bank in another mode can also be utilized as the global banks. With an instruction which is executed in the global bank mode, the address mode part thereof cannot designate a previous bank or a current bank. Besides, in the global bank mode, the advance ring bank instruction and the retract ring bank instruction cannot be used.

Figure 9:
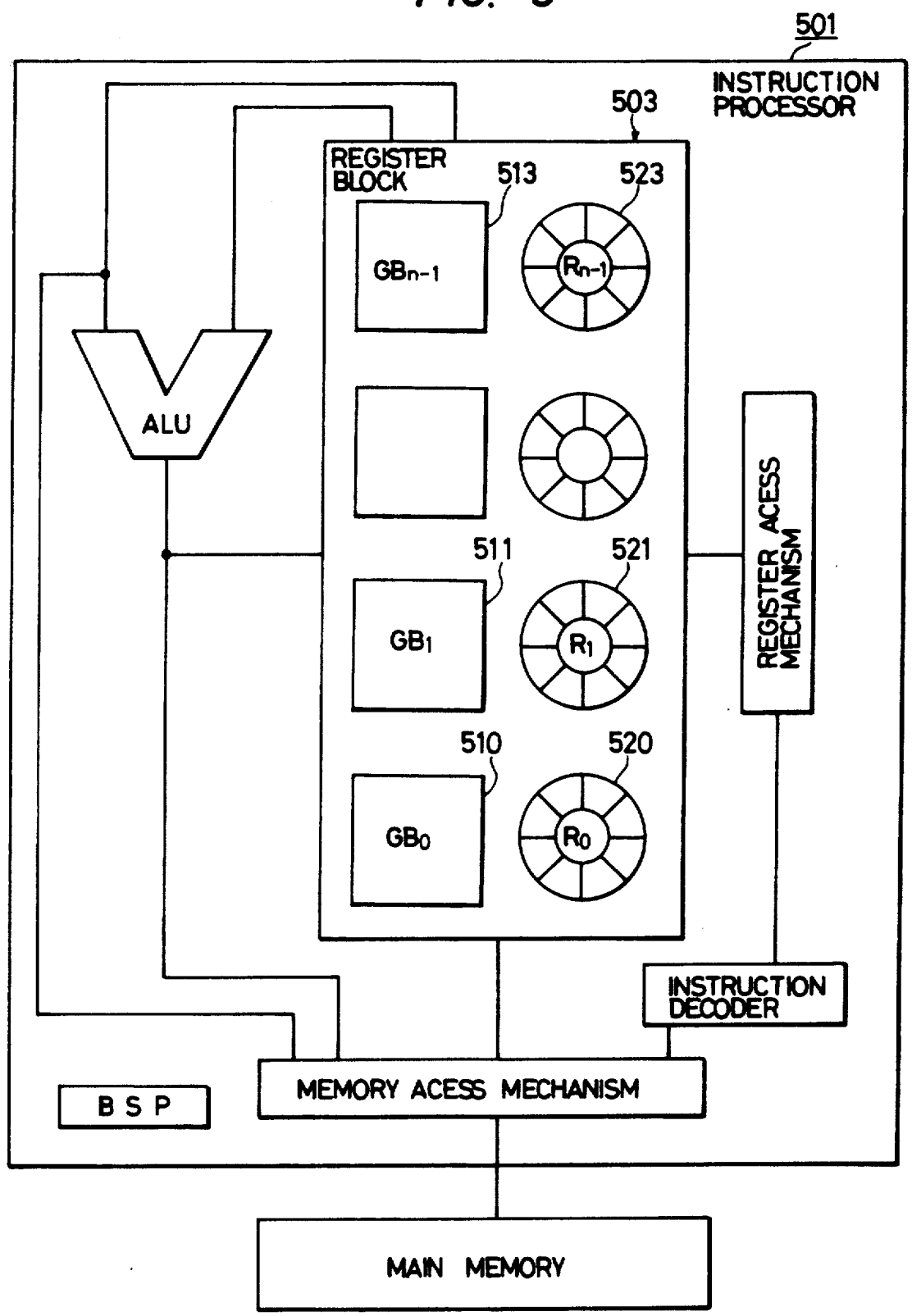
FIG. 9 is an arrangement diagram of essential portions showing the fifth embodiment of the present invention.

FIG. 9 is an arrangement diagram of the essential portions of an information processing apparatus showing the fourth practicable example based on the construction as shown in FIG. 4. In this example, a register block 503 in an instruction processor 501 is configured of n global banks $GB_0$ at numeral 510, $GB_1$ at numeral 511, ... and $GB_{n-1}$ at numeral 513, and n ring banks $R_0$ at numeral 520, $R_1$ at numeral 521, .... and $R_{n-1}$ at numeral 523. Each of the global banks $GB_0$, $GB_1$, ... and $GB_{n-1}$ is composed of k' registers as shown in FIG. 5(b). As shown in FIG. 5(a), each of the ring banks $R_0$, $R_1$, ... and $R_{n-1}$ is composed of m banks, each of which is composed of $\lambda$ registers.

In the embodiment of FIG. 9, one global bank and one ring bank are allotted to each of programs which are asynchronously executed. In this way, the overhead of the save and restore of the register block attendant upon the task switches is eliminated.

Figure 10:
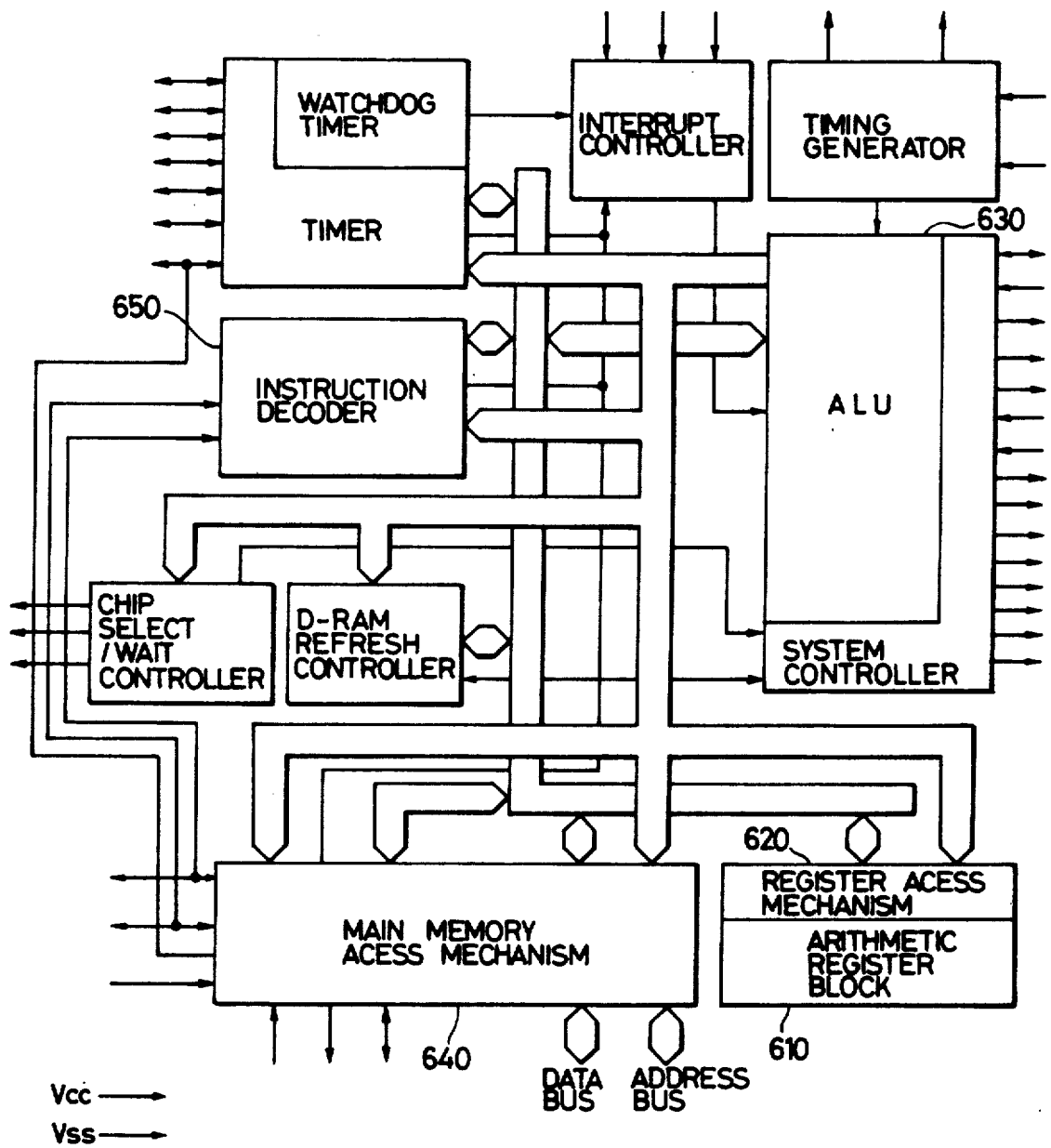
FIG. 10 is a diagram in the case where an instruction processor in FIG. 4 is fabricated in a single semiconductor chip.

FIG. 10 shows an example in which, in the practicable example of FIG. 4, the instruction processor is fabricated in a single semiconductor chip. This example is implemented in the form in which the single semiconductor chip includes therein an arithmetic register block 610, a register access mechanism 620, an ALU 630, a main memory access mechanism 640, an instruction decoder 650, and circuits for controlling them.

In this manner, in the present embodiment, the number of registers which can be assigned is determined by the number of bits of an area register and which is larger than the number of bits of the register designator part of an instruction. Therefore, even when the register designator part of each individual instruction is short, a very large number of registers can be used. Moreover, by exploiting the fact that the large number of registers can be used, the register block can be utilized as one or several stacks. Therefore, even in a case where a register block of large capacity is included, the subprogram call or the task switch can be executed without saving and restoring registers or merely by saving and restoring a very small number of area registers, and high-speed processing which uses high-speed registers in large quantities can be realized without an overhead. Especially with the third embodiment, in the ring bank mode, the save and restore of registers attendant upon the call and return of the subprogram are unnecessary except when the current bank pointer advances beyond the valid bank pointer and when the previous bank pointer retracts beyond the valid bank pointer, and hence, the speed of the subprogram reference can be raised. Besides, it is possible to allot different global banks to the respective programs which are asynchronously executed and to draw up a program which uses a global bank allotted in dedicated fashion, as regards programs each of which uses only a small number of registers. In such a case, therefore, the replacement of registers attendant upon the change-over of programs can be avoided, and the speed of the program change-over such as the task switch can be raised. At the time of the subprogram reference, an argument and a function value can be delivered through registers without copying, under the condition that a current bank till then is regarded as the next previous bank, and hence, the speed of the subprogram reference can be raised. Even in a case where the ring bank needs to be saved and restored, a save indicator register is held in each bank of the ring bank, whereby the registers to be saved and restored can be limited to truly necessary ones only. Therefore, the processing can be raised in speed.

The prior art has had the dilemma that, when the number of physical registers is increased, the overhead of register saving and restoration increases in subprogram reference or task switch operations. In contrast, according to the present embodiment, increase in the number of registers reduces the frequency of saving and restoration, and hence, there is the effect that the overhead can be decreased. Besides, with the global bank mode, the apparatus can be run without the saving and restoration, so that tasks which can be switched at high speed can be provided in large numbers.

Further, when a plurality of ring banks are provided as in the fourth embodiment, the saving and restoration of registers attendant upon task switches can be eliminated even in the case of using the ring banks, and high-speed task switch operations can be realized.

As described above, according to the present invention, registers to be used in individual instructions can be determined at the run time of a program, not at the generation time of the program. At any point of time, therefore, the optimum register allocation can be done in conformity with the previous usage of registers and a request for the use of registers at that point of time. In addition, the number of registers which can be specified is determined by the number of bits of an area register and is larger than the number of bits of the register designator part of an instruction, so that even when the register designator part of each individual instruction is short, a very large number of registers can be used.

What is claimed is:

1. A processor system, comprising:
a main storage for storing data and instructions, some of said instructions having an operation code and an operand part including a register designating part, and wherein said instructions form a plurality of programs, at least one of which contains a plurality of subprograms;
first means for decoding instructions of said program;
a plurality of first registers which are allocated to said program, one first group of said first registers being employed in the execution of said plurality of programs, and at least one second group of said first registers forming a plurality of multi-register areas, each of which is selectively allocated to said subprograms;
a second register storing information which identifies one of said multi-register areas allocated to one of said subprograms and the content of which is controlled by the operation code of instructions decoded by said first means, wherein one of the registers in said multi-register area identified by said second register is specified by said register designating part of an instruction; and
processing means for processing instructions according to decoded operation codes and the content of registers in the multi-register area identified by said second register and specified by decoded register designating parts, wherein the operation codes of some instructions indicate that the content of said second register is advanced or retracted and the operation codes of other instructions indicate that a subprogram to be allocated to a multi-register area is to be called from a current subprogram without advancement of the contents of said second register or that the current subprogram is to be returned to a previous subprogram without retraction of the contents of said second register.

2. A processor system according to claim 1, wherein said first registers in said second group are addressable registers disposed in sequence in a ring-bank configuration.

3. A processor system according to claim 1, wherein said first means for decoding instructions, said plurality of first registers and said processing means are fabricated on a single semiconductor chip as a microprocessor.

4. A processor system, comprising:
a main storage for storing instructions having an operation code and an operand part, the operand part of at least some of said instructions including a register designating part, a group of said instructions forming a program which contains a plurality of subprograms;
a plurality of first registers forming a plurality of multi-register areas each of which is selectively allocated to said subprograms;
first means for decoding instructions, said instructions including first instructions having operation codes which indicate that a subprogram is to be called from a current subprogram or that the current subprogram is to be returned to the previous subprogram and second instructions which specify to change an indication of a multi-register area;
second means controlled only by second instructions for indicating a multi-register area of first registers allocated to at least one current subprogram, wherein at least some of said subprograms do not include a second instruction, whereby a single multi-register area is employed in the execution of plural subprograms;
processing means for processing instructions in response to the operation code thereof as decoded by said first means, including means for effecting operations using the content of a register in a multi-register area indicated by said second means and specified by a register designating part of an instructions.

5. A processor system according to claim 4, wherein said second means including a second register whose content designates a multi-register area of first registers, said processor means further including means responsive to execution of a second instruction for altering the content of said second register to advance or retract the indication of a multi-register area forming said content.

6. A processor system according to claim 4, wherein said first registers are addressable registers disposed in sequence in a ring-bank configuration.

7. A processor system according to claim 4, wherein said first means for decoding instructions, said plurality of first registers and said processing means are fabricated on a single semiconductor chip as a microprocessor.

8. A processor system, comprising:
a main storage for storing data and instructions, at least some instructions having an operation code and an operand part including a register designating part, and wherein said instructions are part of a program which contains a plurality of subprograms, and further including a save area for the operations of saving data therein or restoring data therefrom;
first means for decoding instructions of said program;
a plurality of first registers which are allocated to said program, and at least some of first registers forming a plurality of multi-register areas each of which is selectively allocated to said subprograms;
a second register storing information which identifies one of said multi-register areas allocated to one of said subprograms and the content of which is controlled by the operation code of instructions decoded by said first means, wherein one of the registers in said multi-register area identified by said second register is specified by said register designating part;
a third register for indicating a position of one of said multi-register areas of said first registers for triggering said data saving or restoring operations, wherein the operation codes of some instructions indicate operations in which the content of said second register is advanced or retracted, or a subprogram is called from a current subprogram or the current subprogram is returned to a previous subprogram; and
processing means for processing instructions according to decoded operation codes and contents of registers indicated by said second register and specified by decoded register designating parts, including means responsive to all of said multi-register areas being occupied by subprograms, as indicated by a determination of correspondence between the contents of said second and third registers as a result of said advancing or calling operations, for saving the content of the multi-register area specified by the content of said third register to said save area of said main storage, and for advancing the content of the third register corresponding to the advance of the content of said second register, and means responsive to determination of correspondence between the contents of said second and third registers as a result of said retracting or returning operations for restoring data from said save area of said main storage to the multi-register area specified by the content of said third register, and the retracting the content of the third register corresponding to the retraction of the content of said second register.

9. A processor system according to claim 8, wherein instructions whose operation codes indicate that the content of said second register is to be advanced or to be retracted are instructions different from instructions whose operation codes indicate that a subprogram is to be called from a current subprogram or that the current subprogram is to be returned to a previous subprogram.

10. A processor system according to claim 8, wherein a multi-register area allocated to a subprogram has a register to hold register save-indications that indicate which first registers contained in said multi-register area contain information to be retained for said subprogram and said processing means operates, when said saving or restoring operation is performed, to save or restore only the contents of the first registers indicated by said save-indications.

11. A processor system according to claim 8, wherein the operation codes of other instructions processed by said processing unit indicate that the contents of a plurality of said multi-register areas comprising said first registers are to be saved to or restored from said save area.

12. A processor system according to claim 8, wherein the operation code of another instruction indicates that the contents of said first registers contained in multi-register areas starting from a multi-register area indicated by said second register and ending with a multi-register area indicated by said third register are to be saved to said save area.

13. A processor system according to claim 8, wherein said first means for decoding instruction, said plurality of first registers and said processing means are fabricated on a single semiconductor chip as a microprocessor.

14. A processor system according to claim 8, wherein said first registers are addressable registers disposed in sequence in a ring-bank configuration.

15. A processor system according to claim 14, wherein the content of said second register represents a first pointer which indicates a multi-register area substantially entirely ahead of said first pointer within the ring-bank of first registers.

16. A processor system according to claim 15, further including a fourth register whose content represents a second pointer behind said first pointer and which indicates a multi-register area located between the first and second pointers.

17. A processor system, comprising:
a main storage for storing data and instructions having an operation code part, some of said instructions having a register designating part and/or a main storage designating part, said instructions forming a plurality of programs at least one of which contains a plurality of subprograms;
first means for decoding instructions of said program;
a plurality of registers, a plurality of first groups of which are allocated respectively to respective ones of said plurality of programs, and at least one second group of which is divided into multi-register areas which are selectively allocated to subprograms corresponding to one of said programs, where the number of second groups is less than the number of first groups of said registers;
second means for specifying a register by the content of one of said registers specified by one field of a register designating part of a decoded instruction and a displacement value specified by another field of said register designating part of said decoded instruction; and
processing means for processing said instructions according to the operation code thereof and the content of the register specified by said second means when said instruction has a register designating part, and data from said main storage when said instruction has a main storage designating part, whereby different ones of said programs allotted to respective ones of said first groups of registers can be executed asynchronously without requiring save/restore operations and subprograms corresponding to said one of said programs and allocated respectively to said multi-register areas of said second group of registers can be executed with a reduced number of save/restore operations by selected register designation under instruction control.

18. A processor system according to claim 17, wherein said second groups of registers are addressable registers disposed in sequence in a ring-bank configuration.

19. A processor system according to claim 17, wherein said first means for decoding instructions, said plurality of first registers and said processing means are fabricated on a single semiconductor chip as a microprocessor.

20. A processor system, comprising:
   a main storage for storing data and instructions having an operation code part, some of said instructions having a register designating part and/or a main storage designating part, said instructions forming a plurality of programs at least one of which contains a plurality of subprograms;
   first means for decoding instructions;
   a plurality of first registers, a plurality of first groups of which are allocated respectively to respective ones of said plurality of programs, and at least one second group of which is divided into multi-register areas which are selectively allocated to subprograms corresponding to one of said programs;
   a second register for storing information which indicates one of said multi-register areas allocated to one of said subprograms and the content of which is controlled by the operation code of instructions decoded by said first means, wherein one of the registers in said register area identified by said second register is specified by said register designating part;
   second means for specifying a register by the content of one of said registers specified by one field of a register designating part of a decoded instruction and a displacement value specified by another field of said register designating part of said decoded instruction; and
   processing means for processing said instructions according to the operation code thereof and the content of the register specified by the decoded register designating part and included in the multi-register area indicated by the information stored in said second register, whereby different ones of said programs allotted to respective ones of said first groups of registers can be executed asynchronously without requiring save/restore operations and subprograms corresponding to said one of said programs and allocated respectively to said multi-register areas of said second group of registers can be executed with a reduced number of save/restore operations by selected register designation under instruction control;
   wherein the operation codes of some instructions indicate operations in which the content of said second register is to be advanced or retracted or in which a subprogram is called from a current subprogram or in which the current subprogram is returned to a previous subprogram.

21. A processor system according to claim 20, further comprising indicating means for indicating a number of said first groups of said first registers and a number of multi-register areas of said second group of said first registers, and wherein certain instructions having operation codes which indicate that the state of said indicating means is to be changed so as to change the number of said groups of said first registers and the number of said multi-register areas of said second group of said first registers; said processing means including means responsive to said certain instructions for changing the state of said indicating means.

22. A processor system according to claim 20, wherein said first means for decoding instructions, said plurality of first registers and said processing means are fabricated on a single semiconductor chip as a microprocessor.

23. A processor system according to claim 20, wherein said second group of first registers are addressable registers disposed in sequence in a ring-bank configuration.

24. A processor system according to claim 20, wherein said second means includes means for effecting an OR operation between the information stored in said second register and a displacement value specified by the register designating part of said instruction to produce a register indication having an upper part corresponding to an upper part of the information stored in said second register and a lower part formed by an OR operation between a lower part of the information stored in said second register and said displacement value.

25. A processor system according to claim 24, wherein one or more significant bit positions of said lower part of the information stored in said second register have a zero value when corresponding bit positions of said displacement part of said instruction provide register designating information, and one or more significant bit positions of said displacement value are zero when corresponding bit positions of said lower part of said second register provide multi-register area designating information; whereby the number of registers forming said multi-register areas may be selectively varied according to the information stored in said second register and the displacement value specified by the register designating part of said instruction.

26. A processor system according to claim 20, further comprising a third register for storing information which indicates a group of said first groups of first registers.

27. A processor system according to claim 26, further comprising a fourth register for storing information which indicates a multi-register area located behind the multi-register area indicated by said second register.

28. A processor system, comprising:
   a main storage for storing data and instructions having an operation code part, some of said instructions having a register designating part, and at least one of said instructions having both a register designating part and a main storage designating part;
   first means for decoding instructions;
   a plurality of registers grouped to form a plurality of multi-register areas;
   a plurality of multi-register area designating means each for storing information designating one of said multi-register areas;
   second means for specifying a register by the content of one of said multi-register area designating means specified by one field of a register designating part of a decoded instruction and a displacement value specified by another field of said register designating part of said decoded instruction, whereby switching between multi-register areas may be effected by selecting respective multi-register area designating means under instruction control; and processing means for processing said instructions according to the operation code thereof and the content of the register specified by said second means when said instruction has a register designating part and data from said main storage when said instruction has a main storage designating part.

29. A processor system according to claim 28, wherein said second means includes means for effecting an OR operation between the content of one of said multi-register area designating means specified by one field of a register designating part of a decoded instruction and a displacement value specified by another field of said register designating part of said decoded instruction.

30. A process system according to claim 28, wherein said processing means includes means responsive to the operation code of certain instructions for setting in each multi-register area designating means information from said certain instructions for designating a multi-register area.

31. A processor system according to claim 28, wherein said first means for decoding instructions, said plurality of first registers and said processing means are fabricated on a single semiconductor chip as a microprocessor.

32. A processor system, comprising:

a main storage for storing data and instructions, some of said instructions having an operation code and an operand part including a register designating part, and wherein said instructions form a program which contains a plurality of subprograms;

first means for decoding instructions of said program;

a plurality of first registers which are allocated to said program, and at least some of said first registers forming a plurality of multi-register areas, each of which is selectively allocated to said subprograms;

a second register storing a pointer which indicates one of said multi-register areas allocated to one of said subprograms and the content of which is controlled by the operation code of instructions decoded by said first means, wherein one of the registers in said multi-register area identified by said second register is specified by said register designating part of an instruction; and processing means for processing instructions according to decoded operation codes and the content of registers in the multi-register area identified by the pointer stored in said second register and specified by decoded register designating parts, and including means responsive to operation codes of other instructions calling a subprogram from a current subprogram without advancement of the pointer stored in said second register or returning a current subprogram to a previous subprogram without retraction of the pointer stored in said second register, so that at least one of said subprograms, which does not have an instruction including an operation code for advancing or retracting the pointer stored in said second register, will share a multi-register area with at least one other subprogram.

33. A processor system according to claim 32, wherein said first registers are addressable registers disposed in sequence in a ring-bank configuration.

34. A processor system according to claim 32, wherein said first means for decoding instructions, said plurality of first registers and said processing means are fabricated on a single semiconductor chip as a microprocessor.

* * * * *

UNITED STATES PATENT AND TRADEMARK OFFICE
CERTIFICATE OF CORRECTION

PATENT NO. : 5,214,786
DATED : May 25, 1993
INVENTOR(S) : T. WATANABE, et al

It is certified that error appears in the above-identified patent and that said Letters Patent is hereby corrected as shown below:

Title page, item [30] should read as follows:
--[30]    Foreign Application Priority Data Apr. 14, 1986 [JP] Japan . . . . . 61-85442--

Signed and Sealed this

Thirty-first Day of May, 1994

Attest:

BRUCE LEHMAN

*Attesting Officer*    *Commissioner of Patents and Trademarks*